United States Patent
Walpen et al.

(10) Patent No.: US 12,115,527 B2
(45) Date of Patent: Oct. 15, 2024

(54) PIPETTE DEVICE WITH ELECTROMAGNETICALLY DRIVABLE LOCKING ACTUATOR FOR LOCKING RELEASABLY COUPLED PIPETTE TIPS

(71) Applicant: Hamilton Bonaduz AG, Bonaduz (CH)

(72) Inventors: Silvio Walpen, Stäfa (CH); Fridolin Gysel, Adliswil (CH)

(73) Assignee: HAMILTON BONADUZ AG, Bonaduz (CH)

( * ) Notice: Subject to any disclaimer, the term of this patent is extended or adjusted under 35 U.S.C. 154(b) by 1193 days.

(21) Appl. No.: 16/762,594

(22) PCT Filed: Nov. 8, 2018

(86) PCT No.: PCT/EP2018/080581
§ 371 (c)(1),
(2) Date: May 8, 2020

(87) PCT Pub. No.: WO2019/092089
PCT Pub. Date: May 16, 2019

(65) Prior Publication Data
US 2020/0360916 A1  Nov. 19, 2020

(30) Foreign Application Priority Data

Nov. 10, 2017 (DE) ..................... 10 2017 220 042.1

(51) Int. Cl.
*B01L 3/02* (2006.01)
*G01N 35/10* (2006.01)
(52) U.S. Cl.
CPC ........... *B01L 3/0217* (2013.01); *B01L 3/0279* (2013.01); *B01L 2200/025* (2013.01)
(58) Field of Classification Search
None
See application file for complete search history.

(56) References Cited

U.S. PATENT DOCUMENTS 6,967,004 B2   11/2005  Rainin et al.
7,033,543 B1   4/2006   Panzer et al.
(Continued)

FOREIGN PATENT DOCUMENTS

DE   10 2006 036 764    2/2008
DE   10 2013 218 002    3/2015
(Continued)

OTHER PUBLICATIONS

Machine translation of WO 2017/009227 to Romer et al (Year: 2017).*

(Continued)

*Primary Examiner* — Matthew D Krcha
*Assistant Examiner* — Brittany I Fisher
(74) *Attorney, Agent, or Firm* — Tollefson IP

(57) ABSTRACT

The present invention relates to a pipette device with a pipette channel which extends along a channel axis defining an axial direction and which passes through a channel component arrangement which, at a coupling longitudinal end, has a coupling configuration for the releasable coupling of a pipette tip. The coupling configuration has a locking component with a radially outwardly facing engagement surface arrangement, which is movable between a locking position more radially remote from the channel axis and an unlocking position lying radially closer to the channel axis. The coupling configuration has a sealing component separate from the locking component, and that the actuator drive has a switchable magnetic field source and a reaction component which is movable by the locally changing magnetic field thereof and which is connected to the locking actuator in such a way as to transmit movement.

13 Claims, 4 Drawing Sheets

(56) References Cited

U.S. PATENT DOCUMENTS

| | | |
|---|---|---|
| 9,180,447 B2 | 11/2015 | Schlegel et al. |
| 9,415,388 B2 | 8/2016 | Panzer et al. |
| 10,632,462 B2 | 4/2020 | Issadore et al. |
| 2006/0233669 A1 | 10/2006 | Panzer et al. |
| 2010/0019621 A1 | 8/2010 | Jungheim et al. |
| 2010/0196210 A1* | 8/2010 | Jungheim ............ B01L 3/0275 422/526 |
| 2010/0247378 A1* | 9/2010 | Cerra ................ G01N 35/1011 422/511 |
| 2011/0076205 A1* | 3/2011 | Kelly .................. B01L 3/0279 422/525 |
| 2013/0233096 A1 | 9/2013 | Schlegel et al. |
| 2013/0291660 A1 | 11/2013 | Wilmer et al. |
| 2018/0185836 A1 | 7/2018 | Romer et al. |

FOREIGN PATENT DOCUMENTS

| | | | |
|---|---|---|---|
| DE | 10 2015 213 005 | 1/2017 | |
| EP | 1 862 219 | 12/2007 | |
| JP | H06-320021 A | 11/1994 | |
| JP | 2003-180828 A | 7/2003 | |
| JP | 2005-080495 A | 3/2005 | |
| JP | 2006-035149 A | 2/2006 | |
| JP | 2014-506445 A | 3/2014 | |
| WO | 00/62933 | 10/2000 | |
| WO | WO-2017009227 A1 * | 1/2017 | ............ B01L 3/0275 |
| WO | 2017/017084 A | 2/2017 | |

OTHER PUBLICATIONS

JP Office Action for JP 2020-525904 dated Oct. 24, 2022, which corresponds to the present application.

Search Report issued in German Application No. DE 10 2017 220 042.1 dated Jul. 9, 2018.

International Search Report issued in International Application No. PCT/EP2018/080581 dated Dec. 17, 2018.

* cited by examiner

PIPETTE DEVICE WITH ELECTROMAGNETICALLY DRIVABLE LOCKING ACTUATOR FOR LOCKING RELEASABLY COUPLED PIPETTE TIPS

CROSS-REFERENCE TO RELATED APPLICATIONS

This application is the National Stage of International Application No. PCT/EP2018/080581, filed on Nov. 8, 2018, which claims the benefit of German Application No. DE 10 2017 220 042.1, filed on Nov. 10, 2017. The contents of both applications are hereby incorporated by reference in their entirety.

DESCRIPTION BACKGROUND OF THE INVENTION

The present Application relates to a pipetting apparatus having a pipetting conduit that extends along a conduit axis defining an axial direction and radial directions orthogonal thereto, and that passes through a conduit component arrangement that comprises, at a coupling longitudinal end, a coupling configuration for releasable attachment of a pipette tip; the coupling configuration comprising a locking component having an engagement surface arrangement which faces radially outward with reference to the conduit axis and is displaceable between a locked position located radially farther from the conduit axis and an unlocked position located radially closer to the conduit axis; the pipetting apparatus further comprising a locking actuator that is shiftable along the conduit axis between an engagement position in which the locking actuator is in engagement with the locking component in such a way that it prevents a displacement of the engagement surface arrangement from the locked position into the unlocked position and a release position in which the locking actuator permits assumption of the unlocked position by the engagement surface arrangement; the pipetting apparatus further comprising an actuator drive system that is motion-transferringly connected to the locking actuator in order to drive the locking actuator at least in a motion direction for shifting between an engagement position and a release position.

A pipetting apparatus of the species is known from EP 1 171 240 A. The locking component of this known pipetting apparatus is an elastomeric sealing O-ring that becomes axially crushed, and thus radially expanded, by the locking actuator during displacement thereof from the release position into the engagement position. An encircling surface portion, located radially externally with reference to the conduit axis, of the sealing O-ring constitutes the engagement surface arrangement of this locking component. As a result of the radial expansion produced along with the axial crushing, the engagement surface arrangement of the known locking component can be displaced radially outward along its entire periphery, where it can physically engage into a corresponding groove in a partition, facing toward the conduit axis, of a coupling formation of a pipette tip. The pipette tip is thereby retained in positively engaged fashion on the coupling configuration of the known pipetting apparatus.

When the locking actuator is in the release position, conversely, the known locking component is not axially crushed and thus also not radially expanded, the engagement surface arrangement therefore being located radially closer to the conduit axis so that the pipette tip can be pulled or stripped away from the coupling configuration or even falls out by itself.

The known pipetting apparatus is disadvantageous in that the locking actuator must be retained in the engagement position, against the elastic return force of the locking component, for the entire time during which a pipette tip is attached to the coupling configuration. Because, in the known pipetting apparatus, the locking component not only ensures positively engaged physical attachment of the pipette tip onto the coupling configuration of the pipetting apparatus, but furthermore also seals a pipetting space of the pipette tip in the region of the coupling configuration with respect to the external environment, the locking actuator must be retained in the engagement position against the elastic return force of the locking component with sufficient force that both physical and mechanical attachment, and sealing of the pipette tip, are ensured for the entire time the latter is attached to the coupling configuration. This necessitates a relatively strong actuator drive system that, because of the drive force demanded of it over a comparatively long period of time, occupies an undesirably large installation space.

Because pipetting apparatuses as a rule comprise multiple parallel conduits that are intended to be able to pipette within grid dimensions defined by microtitration plates or in general by multiple vessels, the actuator drive system required on each individual pipetting conduit, because of its installation space requirement, jeopardizes the achievement of desired grid dimensions, since pipetting conduits arranged next to one another orthogonally to the conduit axis can be brought only so close to one another before components coupled to the respective adjacent pipetting conduits collide.

One possible way around the problem of insufficient ability to bring adjacent pipetting conduits close together due to excessively large components of the pipetting apparatus is described in EP 2 755 033 A2. In accordance with the approach presented therein, adjacent pipetting conduits are movably guided on two parallel guidance rails arranged at a distance from one another. As a result, the pipetting conduit located directly closest to a pipetting conduit on the same guidance rail is the next-but-one neighbor in terms of the pipetting apparatus as a whole, so that for the individual pipetting conduit and the components connected thereto, more space is available in the context of a predefined grid dimension than the actual grid spacing between two functionally adjacent pipetting conduits, i.e. ones pipetting into directly adjacent vessels. The resulting pipetting apparatus is undesirably complex, however, because it requires a double set of guidance rails and, associated therewith, requires undesirably complex installation as well as an undesirably large installation space.

An alternative way around the aforesaid problem is described by EP 2 410 342 A2, which requires only one guidance rail for all the pipetting conduits of the pipetting apparatus but in which pipetting conduit subassemblies (also referred to among specialists as "pipetting heads") that are directly adjacent along the guidance rails are arranged on the guidance rail alternatingly rotated 180°. Components of a pipetting conduit subassembly which require installation space can thereby be adjacent to a portion of a pipetting conduit subassembly, following directly along the guidance rail, which requires less installation space, so that pipetting conduits adjacent to one another can be brought closer to one another than if, because of a uniform design of the pipetting conduit subassemblies, components requiring installation space were in each case adjacent along the guidance rail. The approach known from EP 2 410 342 A2 requires the production of two different pipetting conduit subassemblies, however, and corresponding care in installation.

EP 1 826 219 A1 discloses a pipetting apparatus whose coupling configuration encompasses components (locking component and sealing component) that are separately embodied and are arranged at an axial distance from one another. The sealing component provides sealing of a pipetting volume of a releasably attached pipette tip. The locking component of this known pipetting apparatus is, however, entirely passive. The known pipetting apparatus has no locking actuator. With this pipetting apparatus, coupling forces for releasable attachment of a pipette tip are therefore limited to relatively low forces achievable with an overridable latching system.

SUMMARY OF THE INVENTION

The object of the present invention is therefore to describe a technical teaching that permits a pipetting apparatus of the kind recited initially to be refined in such a way that it enables conformity with tight grid dimensions simultaneously with a simple construction and simple installation.

This object is achieved by a pipetting apparatus, presented previously as a pipetting apparatus of the species, in which the coupling configuration additionally comprises, at an axial distance from the locking component, a sealing component that is embodied separately from the locking component and extends around the pipetting conduit; and by the fact that the actuator drive system comprises a switchable magnetic-field source and a ferromagnetic reaction component movable by a locally modifiable magnetic field of the switchable magnetic-field source, the reaction component being motion-transferringly connected to the locking actuator.

The present invention achieves the stated object in two stages: because the "coupling locking" function on the one hand and the "sealing" function on the other hand are separated, the force expenditure necessary only for coupling locking can be decreased compared with the approach of EP 1 171 240 A. As a result, a movable ferromagnetic reaction component in interaction with a switchable magnetic-field source is sufficient to move the reaction component and, together therewith, to displace the locking actuator that is motion-transferringly connected to the reaction component. As a result, for example, an electric motor is no longer required as an actuator drive system, and complex, force-increasing linkages between the electric motor and locking actuator, for example spindle drives and the like, can be omitted. Thanks to the lesser force expenditure required because of the separate provision of the sealing function by the sealing component embodied separately from the locking component, it is thus sufficient to move the reaction component by switching the magnetic-field source on and off or by reversing its polarity, depending on whether the reaction component is magnetically soft or permanently magnetic. The actuator drive system, which previously represented the greatest obstacle to decreasing grid dimensions because of its installation space, can thus be implemented in a smaller installation space without thereby causing any loss of pipetting apparatus functionality. The pipetting apparatus can thus be embodied with a pipetting conduit subassembly encompassing the conduit component arrangement having the pipetting conduit embodied therein, the coupling configuration embodied thereon along with the locking component and locking actuator, and furthermore encompassing the actuator drive system, which also allows the implementation of small grid dimensions of less than 10 mm without requiring several guidance rails provided at a distance from one another as in EP 2 755 033 A2, or differently embodied pipetting conduit subassemblies on the same guidance rail as in EP 2 410 342 A2.

With the approach according to the present invention, it is possible to limit the actuator drive system to a dimension of no more than 9 mm in a spatial direction orthogonal to the motion path of the reaction component. It is thus possible to furnish the pipetting apparatus with a plurality of identical pipetting conduit subassemblies, directly successive to one another orthogonally to the conduit axis, each having a width of no more than 9 mm, so that a preferred grid dimension of 9 mm in width can be conformed to by a pipetting apparatus having a plurality of identical pipetting conduit subassemblies directly successive to one another orthogonally to the conduit axis. These identical pipetting conduit subassemblies no longer need to be arranged between two parallel linear guidance arrangements, such as guidance rails, but instead can be arranged on one linear guidance arrangement in such a way that they all project from the linear guidance arrangement in the same direction orthogonal to the longitudinal direction of the linear guidance arrangement. As a result the pipetting apparatus can be physically smaller, for a given number of identical pipetting conduit subassemblies directly adjacent to one another orthogonally to the conduit axis, than with the system of EP 2 755 033 A2. This applies even, and especially, when the linear guidance arrangement nevertheless encompasses a plurality of parallel guidance rails, for example in order to make possible linear-motor motion driving of the individual pipetting conduit subassemblies. It is therefore sufficient to manufacture a single type of pipetting conduit subassembly, all of which can be installed identically on a linear guidance arrangement; this simplifies not only the manufacture but also the installation of the pipetting apparatus.

It is conceivable in principle for the switchable magnetic-field source to comprise a variable-position permanent-magnet arrangement having at least one permanent magnet that can be moved, for example by means of a slender piston-cylinder arrangement, between an active position in which it produces a first motion of the reaction component and a passive position in which it produces no motion, or a second motion opposite to the first, of the reaction component.

But because the actuator drive system as a rule can be arranged on a pipetting conduit subassembly at a sufficient distance from the pipetting conduit, and thus from a liquid to be pipetted, that a certain heating of the actuator drive system cannot influence the liquid to be pipetted, the switchable magnetic-field source is preferably an electromagnetic magnetic-field source. According to a preferred refinement of the present invention, the switchable magnetic-field source therefore comprises a coil made of electrically conductive material.

In principle, the core made of electrically conductive material can comprise a core, in particular a ferromagnetic core, that attracts or does not attract, or attracts or repels, the reaction component depending on the energization state of the coil. This is because, as already stated above, the reaction component can be magnetically soft, i.e. ferromagnetic but unmagnetized, or can be permanently magnetic, i.e. ferromagnetic and permanently magnetized. In the interest of a maximally simple configuration of the actuator drive system, however, provision is preferably made that the reaction component is movable into and out of the coil space surrounded by the coil. The reaction component can thus preferably constitute a movable armature that, depending on the energization state of the coil, projects to different depths into the coil space surrounded by the coil. In a particularly simple and preferred instance, the reaction component can be the only movable component of the actuator drive system.

It is conceivable in principle for the locking actuator to be drivable by the actuator drive system bidirectionally for displacement. It is advantageous, however, if the locking actuator is displaceable by the actuator drive system in only one displacement direction, while it is preloaded in the opposite displacement direction, for example by gravity or by a corresponding preloading apparatus. According to a preferred refinement of the present invention, the locking actuator is displaceable by the actuator drive system only from the engagement position into the release position. As a result, the actuator drive system is required only for a release pulse when the releasably attached pipette tip needs to be disconnected from the coupling configuration. This further decreases the demand in terms of the force to be delivered by the actuator drive system and its delivery duration, and thus decreases the installation space occupied by the actuator drive system.

In order to allow the furnishing of a defined force that the locking actuator, in the engagement position, exerts on the locking component, provision is preferably made that the locking actuator is preloaded into the engagement position by an actuator preloading means. It can then be sufficient if the actuator drive system is only strong enough to briefly overcome the preload force of the actuator preloading means. When the locking actuator is in the engagement position, however, the actuator drive system does not need to exert any force on the locking actuator or, indirectly via the locking actuator, on the locking component. That force is exerted by the actuator preloading means that is advantageously embodied separately from the actuator drive system. The actuator preloading means can be, for example, a spring, in particular a helical spring, which can be received on the channel component arrangement, surrounding the pipetting conduit, in space-saving fashion coaxially with the conduit axis. The actuator preloading means is preferably a helical compression spring that can be adjusted, by dimensioning and/or material selection, almost arbitrarily in terms of its spring stiffness, and requires at the two longitudinal ends only a respective support surface as a spring counter-brace.

The locking component can be such that when the locking actuator is in the release position, the engagement surface arrangement is in the unlocked position or in a state that is freely movable between the unlocked position and the locked position. By means of a displacement of the locking actuator into the engagement position, the engagement surface arrangement can thus be reliably moved into the locked position and secured therein against motion back into the unlocked position. For example, the engagement surface arrangement can be constituted by external surface portions of a plurality of rolling elements, in particular balls, provided radially movably on the conduit component arrangement, which are preferably received in captive fashion in a rolling-element cage. To avoid unnecessarily high parts counts, the rolling-element cage can be embodied in one piece with a base element, carrying the engagement surface arrangement and the sealing component, of the coupling configuration.

The locking component can also, however, be such that the engagement surface arrangement is preloaded into the locked position and is secured by the locking actuator, in the latter's engagement position, merely against a return motion against the preload force acting on the engagement surface arrangement. The engagement surface arrangement can likewise be preloaded into the unlocked position, and can be moved into the locked position, and retained therein, by displacement of the locking actuator into the engagement position against the preload force acting on the engagement surface arrangement. For example, the engagement surface arrangement can be constituted by surface portions of engagement configurations that are arranged resiliently, for example by way of leaf springs, on a spring carrier. The engagement configurations are preferably embodied in one piece with the springs, in particular leaf springs, that preload them. Also preferably, the leaf springs are embodied in one piece with the aforementioned spring carrier. The spring carrier can be the aforementioned base element of the coupling configuration. A component encompassing the portions (spring carrier, leaf springs, and engagement configurations) that are continuous as a single piece can be generated, for example, by injection-molding of a thermoplastic.

The locking component can therefore be embodied in one piece or in several pieces, an embodiment having an engagement surface arrangement constituted from several non-continuous partial surfaces being preferred, since an engagement surface arrangement of that kind enables a displacement thereof between the locked position and the unlocked position, along a circumference around the conduit axis, with the least displacement force.

The locking actuator can comprise, at its working end facing toward the locking component, a locking configuration that assists the function assigned to the locking actuator. For example, the locking actuator can comprise at its working end a wedge configuration that proceeds around the conduit axis and becomes larger in a radial direction away from the locking component, and has an outer surface, in particular a conical surface, that faces radially outward and is non-parallel to the conduit axis and that comes into engagement, during the displacement of the locking actuator into the engagement position, with a portion of the locking component and, in the engagement position, constitutes a physical barrier to displacement of the engagement surface arrangement into the unlocked position.

Thanks to the use of a sealing component embodied separately from the locking component, the force necessary in order to deform the sealing component, so as to establish sealing of a pipette tip to the coupling configuration of the pipetting apparatus with respect to the external environment, can be exerted by way of the coupling motion of the coupling configuration relative to the coupling formation of the pipette tip.

The coupling formation of the pipette tip, when the latter is in the attached state, preferably radially externally surrounds a portion of the coupling configuration. Both the sealing component and the locking component are arranged in this axial portion of the coupling configuration surrounded by the coupling conformation of the pipette tip, in order to ensure engagement of those two components with the coupling formation.

The sealing component is preferably an elastomeric sealing O-ring that, upon introduction of the coupling configuration into the coupling formation of the pipette tip, becomes radially deformed and thereby comes into sealing abutment with an abutment surface, provided on the coupling formation, of the pipette tip. Preferably the sealing component is arranged closer than the locking component to the free longitudinal end, comprising the opening of the pipetting conduit, of the coupling formation, so that the sealing component can protect the locking component from the influence of liquid that can be aspirated into a temporarily attached pipette tip.

As a result of friction between the coupling formation of a pipette tip and the coupling configuration, in particular between the sealing component and the coupling formation, a pipette tip, once it has been attached in locked fashion to the coupling configuration can remain on the coupling configuration even when the engagement surface arrangement is displaced or displaceable into its unlocked position. It is conceivable, when the engagement arrangement is no longer retained by the locking actuator in its locked position, for the pipette tip to be stripped off, by movement of the pipetting conduit in a direction orthogonal to the conduit axis, at a stripper apparatus provided in the working region of the pipetting apparatus, but this would considerably slow down successive pipetting operations on a given pipetting conduit. Provision is therefore preferably made that the pipetting apparatus comprises a stripper arrangement that is shiftable along the conduit axis between a stripping position in which the stripper arrangement is located closer to the coupling longitudinal end and a readiness position in which the stripper arrangement is located farther from the coupling longitudinal end. Preferably the stripper arrangement surrounds the conduit axis, and particularly preferably the stripper arrangement surrounds both the conduit axis and the locking actuator as well as (if present) the actuator preloading means and (if present) a stripper preloading means.

A particularly simple but effective stripper arrangement can be obtained by the fact that the stripper arrangement is preloaded into the stripping position by a stripper preloading means. Once again, the stripper preloading means is preferably a spring, in particular a helical spring, particularly preferably a helical compression spring. The stripper preloading means, embodied as a helical spring, is preferably provided on the conduit component arrangement coaxially with the conduit axis and surrounding the pipetting conduit. The stripper arrangement, which is provided on the pipetting arrangement so as to surround the conduit component arrangement having the pipetting conduit, is part of the aforementioned pipetting conduit subassembly.

The stripper arrangement can advantageously do without a dedicated displacement drive system on the pipetting apparatus if a pipette tip to be attached to the coupling configuration provides, during the coupling motion executed by the pipetting apparatus by which the coupling configuration is introduced into the coupling formation of the pipette tip, for a shifting of the stripper arrangement from the stripping position into the readiness position against the preload force of the stripper preloading means. The relative motion between the coupling configuration and pipette tip upon attachment of the pipette tip is thus utilized in order to shift the stripper arrangement into the readiness position, in which it can be retained by the pipette tip while the pipette tip is attached to the pipetting conduit. This can be implemented on the pipetting apparatus physically by the fact that when the engagement surface arrangement of the locking component is in the locked position and thereby retains the pipette tip on the coupling configuration, the locking actuator is in the engagement position and thus prevents a displacement of the engagement surface arrangement from the locked position into the unlocked position, and in that context the pipette tip retains the stripper arrangement in the readiness position against the preload force of the stripper preloading means. At least one axial end portion, facing toward the coupling configuration, of the stripper arrangement therefore preferably projects radially outward beyond the coupling configuration, so that that axial end portion comes into abutting engagement with a portion of the coupling formation of the pipette tip, for example with an end face thereof, and, driven by the stripper preloading means, can strip the pipette tip away from the coupling configuration as soon as the locking actuator is in the release position and a motion of the engagement surface arrangement into the unlocking position is thus no longer impeded.

In the interest of a particularly slender pipetting conduit subassembly, provision is preferably made that the conduit component arrangement, the locking actuator, and the stripper arrangement are arranged coaxially and do not exceed a dimension of 9 mm in a direction orthogonal to the conduit axis. Once again, this makes possible the provision of a preferred pipetting apparatus having a plurality of identical pipetting conduit subassemblies immediately successive to one another in a direction orthogonal to the conduit axis, preferably having exclusively identical pipetting conduit subassemblies that are all guided on one guidance rail arrangement for movement orthogonally to the conduit axis, all the pipetting conduit subassemblies protruding from that guidance rail arrangement on the same side relative thereto.

BRIEF DESCRIPTION OF THE DRAWING FIGURES

The present invention will be explained in further detail below with reference to the appended drawings, in which.

DETAILED DESCRIPTION OF THE PREFERRED EMBODIMENTS

Figure 1:
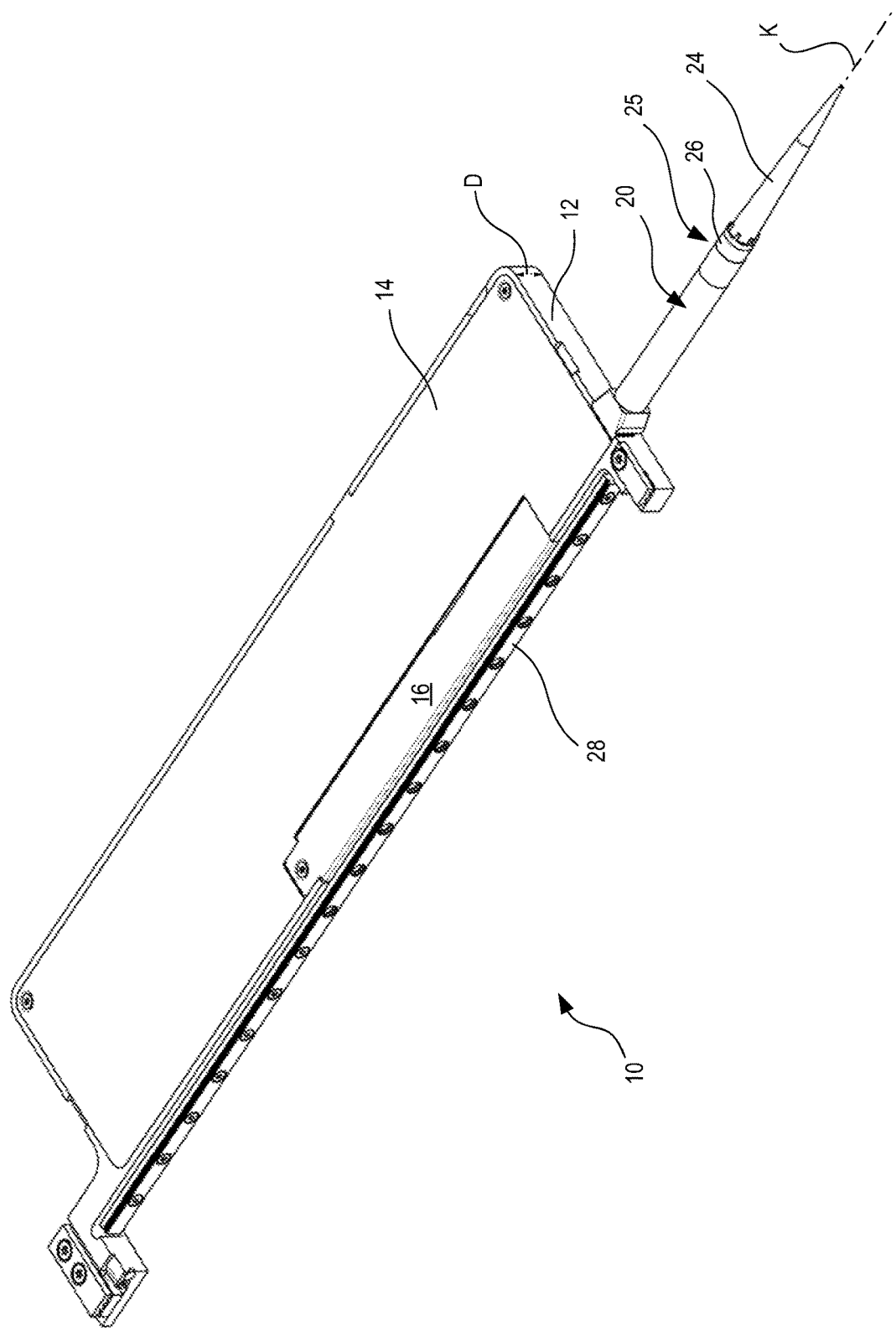
FIG. 1 is a schematic perspective view of a pipetting conduit subassembly (pipetting head) of an embodiment according to the present invention of a pipetting apparatus.

In FIG. 1, a pipetting conduit subassembly of a pipetting apparatus according to the present invention is labeled in general with the number 10. In a particularly simple case, pipetting conduit subassembly 10 itself constitutes the pipetting apparatus. Pipetting conduit subassembly 10 comprises a frame 12 that is covered by a cover 14. Cover 14 comprises an additional cover 16 through which a piston-cylinder arrangement (not depicted in FIGS. 1 to 4), which serves to modify a working-gas pressure in a pipetting conduit 18 extending along a conduit axis K, is accessible (see FIGS. 2 to 4). Pipetting conduit 18 extends inside a conduit component arrangement 20 that comprises a coupling configuration 22 onto which, in FIGS. 1 to 3, a pipette tip 24 is depicted as being releasably attached.

Pipette tip 24 comprises for that purpose, at its coupling-side longitudinal end 25, a coupling formation 26 that, in the state attached to coupling configuration 22, surrounds coupling configuration 22 radially externally with reference to conduit axis K.

Very generally, conduit axis K defines an axial direction that is its direction of extent, and defines radial directions that are oriented orthogonally to the axial direction of conduit axis K.

Pipetting conduit subassembly 10 of FIG. 1 furthermore comprises a guidance rail 28 that proceeds parallel to conduit axis K and makes possible a change in the location of pipetting conduit subassembly 10 along a Z axis, oriented parallel to conduit axis K, of the pipetting apparatus.

Pipetting conduit subassembly 10 of FIG. 1 is usually arranged with guidance rail 28 advanceably parallel to conduit axis K on a motion frame (not depicted), the motion frame itself in turn being received movably along an X axis of the pipetting apparatus which is orthogonal to conduit axis K and parallel to thickness direction D of frame 12.

In the example depicted in FIG. 1, pipetting conduit subassembly 10 is at no point thicker than 9 mm, so that identical pipetting conduit subassemblies 10 can be brought into proximity with one another, along the X axis just described, on a grid dimension of 9 mm. A pipetting apparatus can thus be equipped with identical pipetting conduit subassemblies 10 that all project on the same side from the guidance rail arrangement that guides them in the direction of the above-described X axis. A pipetting apparatus that is both simple to manufacture and to install, and requires only a small installation space, is thereby obtained. The reason for this thin configuration of pipetting conduit subassembly 10 will be explained below with reference to FIGS. 2 to 4.

Pipetting conduit 18 terminates, at a coupling-side longitudinal end (coupling longitudinal end) 30 of conduit component arrangement 20, in a (preferably central) opening 32. Coupling configuration 22 is configured at this end region, comprising coupling longitudinal end 30, of conduit component arrangement 20.

Coupling configuration 22 encompasses a sealing component 34 that is located closer to opening 32 of the pipetting conduit and is embodied, in the example depicted, as an elastomeric sealing O-ring continuously encircling pipetting conduit axis K.

Sealing component 34 is received in an encircling groove 36 of coupling configuration 22 and protrudes radially, with its radially outer sealing surface 38, radially beyond that portion 40 of coupling configuration 22 which is located between sealing component 34 and coupling longitudinal end 30, in order to reliably come into abutment sealingly against an inner wall 42 in coupling formation 26 of pipette tip 24.

A multiple-part locking component 44, whose multiple parts encompass balls 46, is arranged on coupling configuration 22 at an axial distance away from coupling-side longitudinal end 30.

Figure 2:
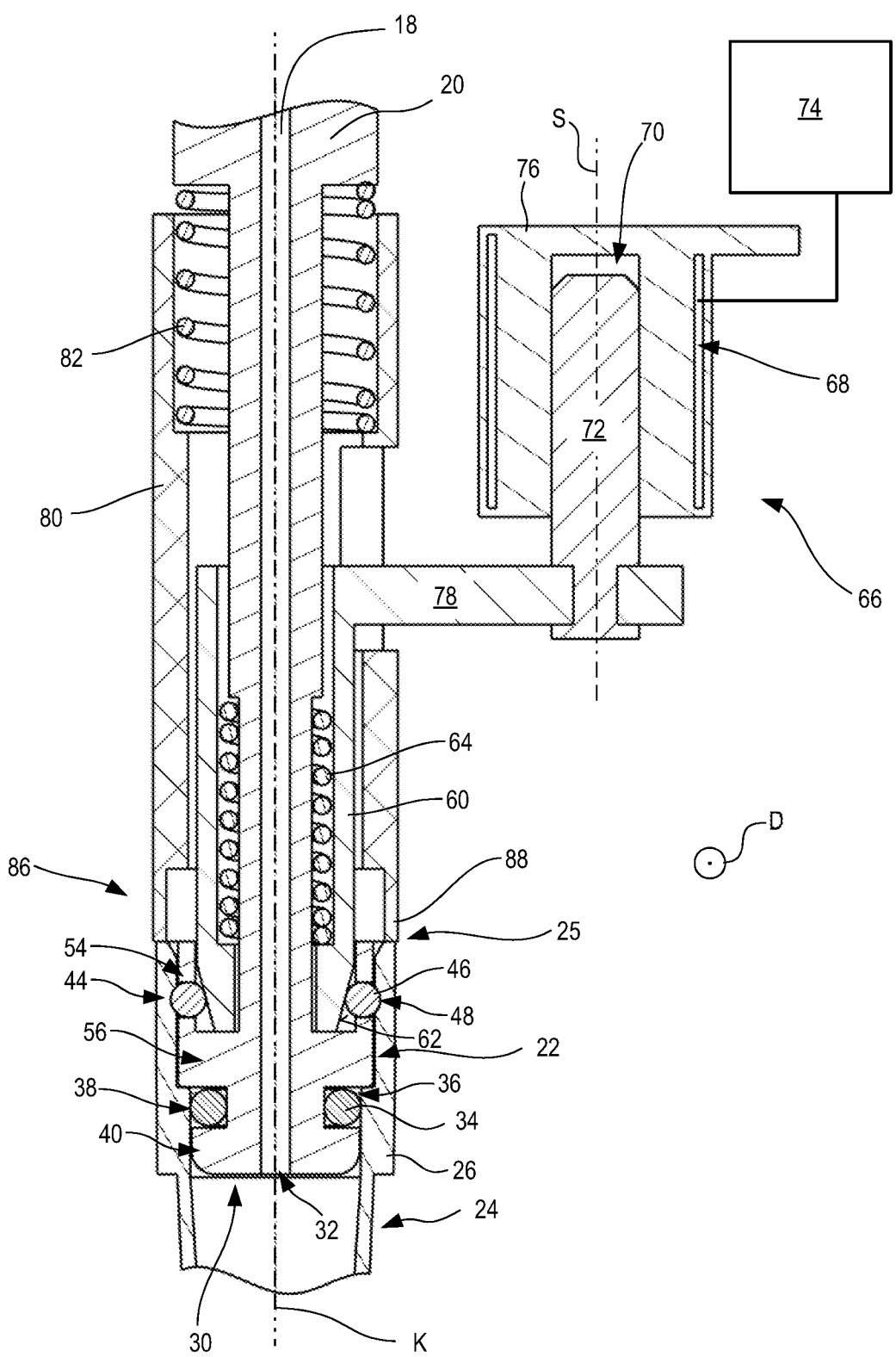
FIG. 2 is a partial longitudinal section view through relevant components of the pipetting conduit subassembly of FIG. 1, with a pipette tip attached and with the locking actuator in the engagement position.

It is evident from FIG. 2 that when engagement surface arrangement 48 is in the locked position shown in FIG. 2, a radially outward-facing engagement surface arrangement 48 of locking component 44 engages into a groove 50 in an inner wall 52 in coupling formation 26 of pipette tip 24. In the example depicted, engagement surface arrangement 48 is constituted by the sum of the individual surface portions, facing radially outward from conduit axis K, of balls 46.

Balls 46 of locking component 44 are retained on coupling configuration 22 captively in a ball cage 54. Ball cage 54 is preferably embodied in one piece with conduit component arrangement 20 that comprises coupling configuration 22. Conduit component arrangement 20 serves as a base element of coupling configuration 22 which carries sealing component 34 as well as further separately embodied components of coupling configuration 22.

Ball cage 54 is part of a substantially cylindrical or slightly conical portion 56 of coupling configuration 22 or of conduit subassembly 20 which adjoins sealing component 34 on its side facing away from coupling-side longitudinal end 30. Portion 56 of coupling configuration 22 has a larger diameter than portion 40, so that portions 56 and 40 together can form a radial projection constituting a mechanical abutment for a radial shoulder 58 in coupling formation 26 of pipette tip 24 in order to allow the axial location of pipette tip 24 relative to coupling configuration 22 to be unequivocally defined in the attached state. In order to attach a pipette tip 24 onto pipetting conduit 18, coupling configuration 22 is therefore introduced axially into coupling formation 26 of pipette tip 24 until that longitudinal end of the larger-diameter portion 56 of coupling configuration 22 which precedes in an introduction direction abuts against radial shoulder 58 in coupling formation 26 of pipette tip 24. Groove 50 is then also located radially opposite locking component 44, so that the latter can physically engage into groove 50 after displacement of engagement surface arrangement 48 into the locked position (see FIG. 2).

The pipetting apparatus comprises a locking actuator 60 that is provided so as to surround conduit axis K and pipetting conduit 18.

Locking actuator 60, which is depicted in FIG. 2 in its engagement position in which an annular wedge surface 62, preferably a conical surface, which tapers toward coupling-side longitudinal end 30 and is at that longitudinal end of locking actuator 60 which is located closer to locking component 44, is in abutting engagement with balls 46 of locking component 44, serves in the present exemplifying embodiment to displace engagement surface arrangement 48 of balls 46 of locking component 44 reliably into the locked position shown in FIG. 2 and secure it there against displacement back into an unlocked position located radially farther inward. Thanks to the abutting engagement of annular wedge surface 62 with locking component 44 in the engagement position shown in FIG. 2, balls 46 of locking component 44 are radially externally immobilized. Engagement surface arrangement 48 is thereby secured in the locked position, so that pipette tip 24 is securely retained on coupling configuration 22 by a positive engagement of engagement surface arrangement 48 with groove 50.

Figure 3:
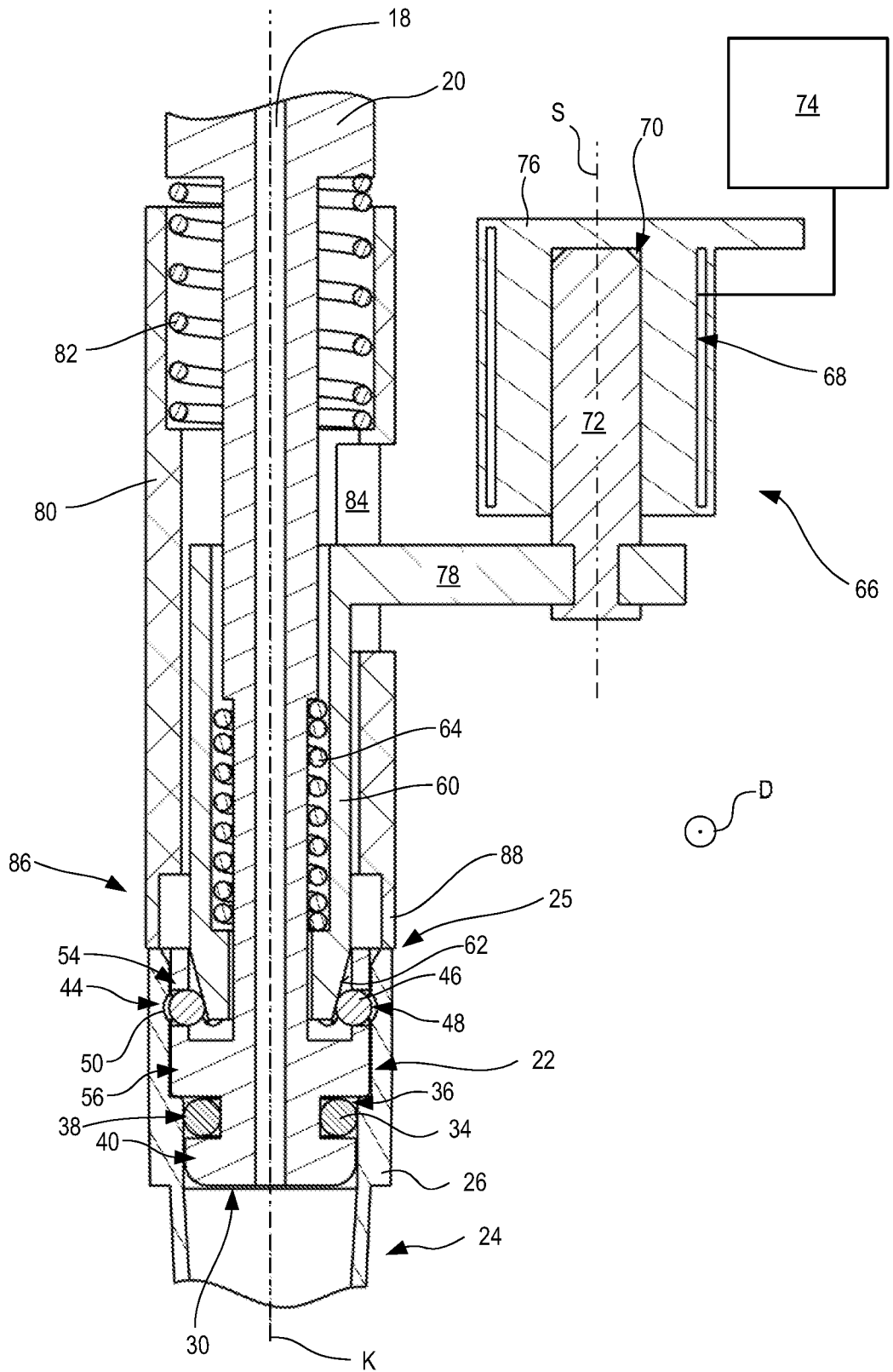
FIG. 3 is the view of FIG. 2 with the locking actuator in the release position, at the beginning of a stripping operation for stripping the pipette tip off the coupling configuration.
Figure 4:
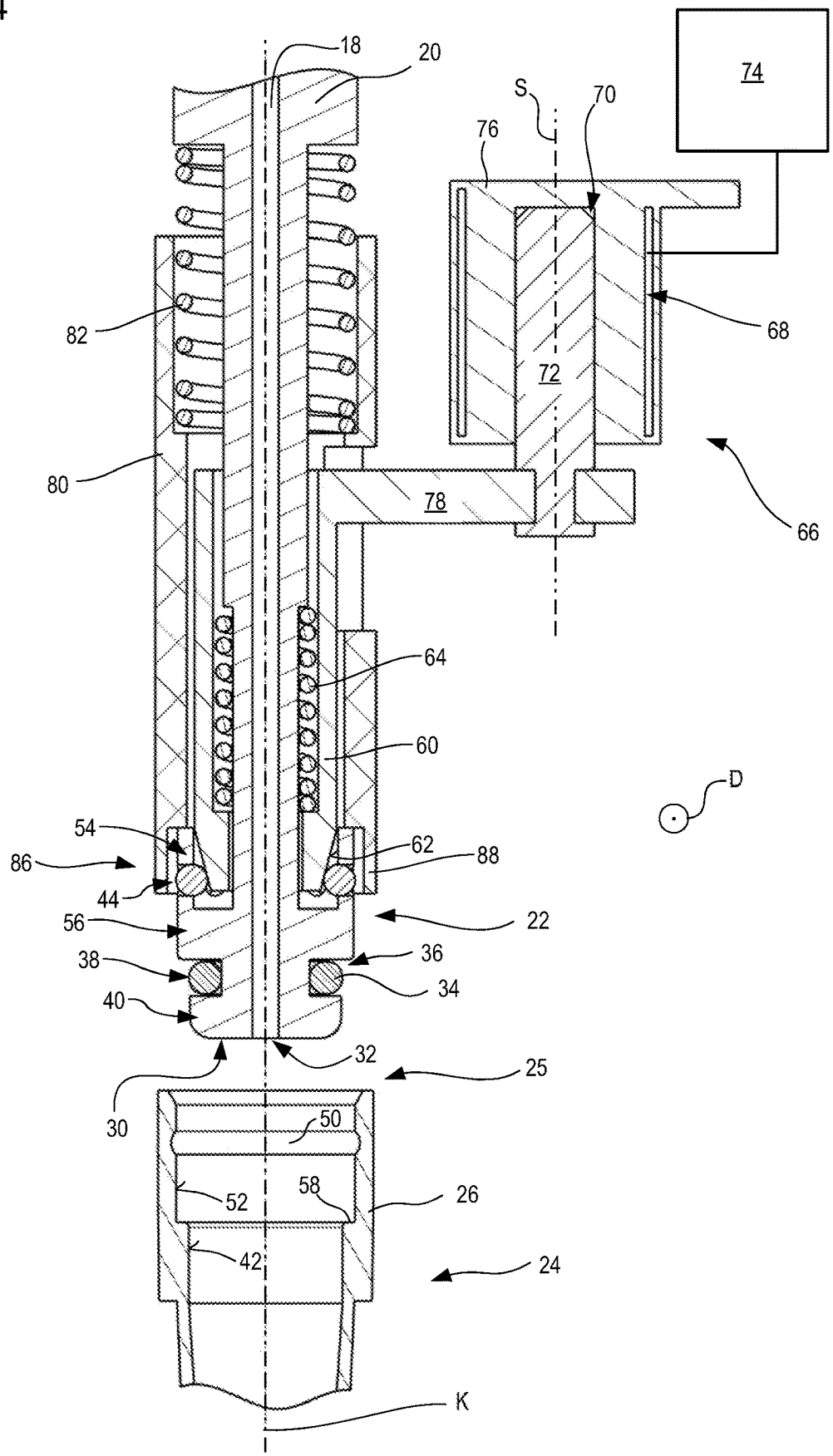
FIG. 4 is the partial longitudinal section view of FIGS. 2 and 3 with the pipette tip stripped off, ready for attachment of a new pipette tip.

Locking actuator 60 is displaceable along conduit axis K between the engagement position shown in FIG. 2 and the release position shown in FIGS. 3 and 4, locking actuator 60 being preloaded into the engagement position by an actuator preloading means 64 in the preferred form of a helical compression spring. Actuator preloading means 64 surrounds pipetting conduit 18 and thus conduit axis K.

In the exemplifying embodiment depicted, when locking actuator 60 is in the release position, balls 46 of locking component 44 lie loose in ball cage 54 and can move freely in a radial direction.

When locking actuator 60 is in the release position depicted in FIGS. 2 and 3, balls 46 of locking component 44 assume a random position but are displaceable with almost zero force, out of the radially outer position which corresponds to the locked position of engagement surface arrangement 48 and in which engagement surface arrangement 48 engages into groove 50 of coupling formation 22 of pipette tip 24, radially inward into a radially inner position, corresponding to the unlocked position of engagement surface arrangement 48, in which engagement surface arrangement 48 no longer engages into groove 50. This displacement of engagement surface arrangement 48 from the locked position into the unlocked position can be effected, for example, by stripping pipette tip 24 out of coupling configuration 22.

With the displacement of locking actuator 60 into the engagement position, balls 46 become displaced into the radially outer position, and engagement surface arrangement 48 constituted by their radially externally located surface portions becomes displaced into the locked position.

Because locking actuator 60 is preloaded by actuator preloading means 64 into the engagement position, all that is needed in order to attach a pipette tip 24, or to strip it off, is to displace locking actuator 60 briefly into the release position in order to allow pipette tip 24, with its coupling formation 26, to be either axially slid onto or axially stripped off coupling configuration 22 with as little force expenditure as possible.

The pipetting apparatus comprises an actuator drive system 66 for displacing locking actuator 60 into the release position as shown in FIGS. 2 and 3. That system is of very simple but effective construction and can therefore be provided in a very small installation space within the 9-mm thickness dimension furnished by pipetting conduit subassembly 10 of FIG. 1.

Actuator drive system 66 comprises a coil 68 that is made of an electrically conductive material and is stationary relative to conduit component arrangement 20 and thus also to frame 12 of pipetting conduit subassembly 10. Coil 68 in turn surrounds a coil space 70 into which a reaction component 72 is introduced. In the example depicted, reaction component 72 is made of magnetically soft material, for example iron.

Magnetic coil 68 is selectably energizable by way of a control device 74 that can also control other operations of the pipetting apparatus. It thus serves as a switchable magnetic-field source.

When coil 68 is energized, a magnetic field is formed in its coil space 70; that field pulls reaction component 72 into coil space 70 along a coil axis S until it comes to a stop against a coil carrier 76.

Reaction component 72 is motion-transferringly connected to locking actuator 60 by a strut 78. When reaction component 72 is completely pulled into coil space 70 by energization of coil 68, that motion is transferred via strut 78 to locking actuator 60, and locking actuator 60 is thereby displaced or raised into the release position shown in FIGS. 3 and 4.

Actuator drive system 66 has a dimension of no more than 9 mm at least in the spatial direction (thickness direction D) orthogonal to the drawing planes of FIGS. 2 to 4, so that actuator drive system 66 can also be arranged within the preferred grid dimension of 9 mm which is an upper thickness limit for the thickness or width of frame 12 or of pipetting conduit subassembly 10 of FIG. 1.

In order to simplify the installation of actuator drive system 66, the latter is preferably no larger than 9 mm in any spatial direction orthogonal to conduit axis K.

This small overall volume is possible because only the force of actuator preload means 64 needs to be overcome by magnetic coil 68 (and even that only briefly).

The pipetting apparatus further comprises a stripper arrangement 80 with which pipette tip 24 can be stripped axially away from coupling configuration 22. Stripper arrangement 80 is shown in FIGS. 2 and 3 in its readiness position located farther from coupling longitudinal end 30, and is shown in FIG. 4 in its stripping position located closer to coupling longitudinal end 30. Stripper arrangement 80 is preloaded into the stripping position shown in FIG. 4 by a stripper preloading means 82 in the preferred form of a helical compression spring.

Stripper arrangement 80 is preferably of tubular configuration and extends along conduit axis K coaxially with pipetting conduit 18, conduit subassembly 20, locking actuator 60, actuator preloading means 64, and stripper preloading means 82, surrounding each of the aforesaid components or subassemblies. An opening 84 in stripper arrangement 80 allows strut 78 to pass through, and thus permits transfer of a motion from reaction component 72 to locking actuator 60.

At its longitudinal end 86 located closer to coupling configuration 22 and to coupling longitudinal end 30, stripper arrangement 80 has a stripper configuration 88 that extends radially out beyond coupling configuration 22, more precisely beyond the larger-diameter portion 56 thereof, in such a way that stripper configuration 88 is displaceable axially, past an axial portion of coupling configuration 22, into the stripping position as shown in FIG. 4. In the stripping position, stripper configuration 88 radially externally surrounds an axial portion of coupling configuration 22.

Stripper arrangement 80 thus has no drive system of its own other than stripper preloading means 82. When a pipette tip 24 is attached to coupling configuration 22, coupling configuration 22 dips into coupling formation 26 of pipette tip 24, with the result that the coupling-side longitudinal end 25 of coupling formation 26 or of pipette tip 24 comes into abutment against stripper configuration 88. As a result of the dipping of coupling configuration 22 into coupling formation 26, stripper arrangement 80 is shifted by means of the drive system of conduit component arrangement 20 in a direction along conduit axis K by pipette tip 24 axially relative to conduit component arrangement 20, against the preload force of stripper preloading means 82, into the readiness position shown in FIGS. 1 and 2. Locking actuator 60 is in the release position in this context, and becomes displaced into the engagement position when pipette tip 24 has assumed its desired axial relative position relative to coupling configuration 22, i.e. when that longitudinal end of larger-diameter portion 56 of coupling configuration 22 which is located closer to coupling longitudinal end 30 has come into axial abutment against radial shoulder 58 of coupling formation 26, so that pipette tip 24 is retained by locking component 44 in the attached state on coupling configuration 22. In the radially outer position, locking component 44 must therefore withstand the force of stripper preloading means 82. This is not a problem, however, because of the mutually orthogonal directions of action (radial for locking component 44 or engagement surface arrangement 48, and axial for stripper preloading means 82).

As soon as locking actuator 60 has been displaced by actuator drive system 66 into the release position, stripper arrangement 80, driven by stripper preloading means 82, displaces pipette tip 24 axially away from coupling configuration 22 and ejects it. The beginning of this ejection motion is depicted in FIG. 2.

The invention claimed is:

1. A pipetting apparatus, comprising:
    a pipetting conduit that extends along a conduit axis defining an axial direction and radial directions orthogonal thereto, and that passes through a conduit component arrangement, said conduit component arrangement comprising, at a coupling longitudinal end, a coupling configuration for releasable attachment of a pipette tip;

wherein the coupling configuration comprises a locking component having an engagement surface arrangement which faces radially outward with reference to the conduit axis and is displaceable between a locked position located radially farther from the conduit axis and an unlocked position located radially closer to the conduit axis;

a locking actuator that is shiftable along the conduit axis between an engagement position in which the locking actuator is in engagement with the locking component in such a way that it prevents a displacement of the engagement surface arrangement from the locked position into the unlocked position and a release position in which the locking actuator permits assumption of the unlocked position by the engagement surface arrangement;

an actuator drive system that is motion-transferringly connected to the locking actuator in order to drive the locking actuator at least in a motion direction for shifting between an engagement position and a release position; and a stripper arrangement that is shiftable along the conduit axis between a stripping position in which the stripper arrangement is located closer to the coupling longitudinal end and a readiness position in which the stripper arrangement is located farther from the coupling longitudinal end;

wherein the coupling configuration comprises, at an axial distance from the locking component a sealing component that is embodied separately from the locking component and extends around the pipetting conduit; and wherein the actuator drive system comprises a switchable magnetic-field source and a ferromagnetic reaction component movable by the locally modifiable magnetic field of the switchable magnetic-field source, the ferromagnetic reaction component being motion-transferringly connected to the locking actuator;

wherein the conduit component arrangement the locking actuator and the stripper arrangement are arranged coaxially and do not exceed a dimension of 9 mm in a direction orthogonal to the conduit axis.

2. The pipetting apparatus according to claim 1, wherein the actuator drive system has a dimension of no more than 9 mm in a spatial direction orthogonal to the motion path of the ferromagnetic reaction component.

3. The pipetting apparatus according to claim 2, wherein the switchable magnetic-field source comprises a coil made of electrically conductive material.

4. The pipetting apparatus according to claim 3, wherein the ferromagnetic reaction component is movable into and out of the coil space surrounded by the coil.

5. The pipetting apparatus according to claim 1, wherein the switchable magnetic-field source comprises a coil made of electrically conductive material.

6. The pipetting apparatus according to claim 5, wherein the ferromagnetic reaction component is movable into and out of the coil space surrounded by the coil.

7. The pipetting apparatus according to claim 1, wherein the locking actuator is displaceable by the actuator drive system only from the engagement position into the release position.

8. The pipetting apparatus according to claim 7, wherein the locking actuator is preloaded into the engagement position by an actuator preloading means.

9. The pipetting apparatus according to claim 1, wherein the locking actuator is preloaded into the engagement position by an actuator preloading means.

10. The pipetting apparatus according to claim 9, having a pipette tip attached to the coupling configuration, wherein the engagement surface arrangement of the locking component is in the locked position and thereby retains the pipette tip on the coupling configuration; the locking actuator being in the engagement position and thus preventing a displacement of the engagement surface arrangement from the locked position into the unlocked position; and the pipette tip retaining the stripper arrangement in the readiness position against the preload force of the stripper preloading means.

11. The pipetting apparatus according to claim 1, having a pipette tip attached to the coupling configuration, wherein the engagement surface arrangement of the locking component is in the locked position and thereby retains the pipette tip on the coupling configuration; the locking actuator being in the engagement position an thus preventing a displacement of the engagement surface arrangement from the locked position into the unlocked position; and the pipette tip retaining the stripper arrangement in the readiness position against the preload force of the stripper preloading means.

12. A pipetting apparatus, comprising:

a pipetting conduit that extends along a conduit axis defining an axial direction and radial directions orthogonal thereto, and that passes through a conduit component arrangement, said conduit component arrangement comprising, at a coupling longitudinal end, a coupling configuration for releasable attachment of a pipette tip;

wherein the coupling configuration comprises a locking component having an engagement surface arrangement which faces radially outward with reference to the conduit axis and is displaceable between a locked position located radially farther from the conduit axis and an unlocked position located radially closer to the conduit axis;

a locking actuator that is shiftable along the conduit axis between an engagement position in which the locking actuator is in engagement with the locking component in such a way that it prevents a displacement of the engagement surface arrangement from the locked position into the unlocked position and a release position in which the locking actuator permits assumption of the unlocked position by the engagement surface arrangement;

an actuator drive system that is motion-transferringly connected to the locking actuator in order to drive the locking actuator at least in a motion direction for shifting between an engagement position and a release position; and a stripper arrangement that is shiftable along the conduit axis between a stripping position in which the stripper arrangement is located closer to the coupling longitudinal end and a readiness position in which the stripper arrangement is located farther from the coupling longitudinal end;

wherein the coupling configuration comprises, at an axial distance from the locking component a sealing component that is embodied separately from the locking component and extends around the pipetting conduit; and wherein the actuator drive system comprises a switchable magnetic-field source and a ferromagnetic reaction component movable by the locally modifiable magnetic field of the switchable magnetic-field source, the ferromagnetic reaction component being motion-transferringly connected to the locking actuator;

wherein the stripper arrangement is preloaded into the stripping position by a stripper preloading means.

13. A pipetting apparatus, comprising:

a pipetting conduit that extends along a conduit axis defining an axial direction and radial directions orthogonal thereto, and that passes through a conduit component arrangement, said conduit component arrangement comprising, at a coupling longitudinal end, a coupling configuration for releasable attachment of a pipette tip;

wherein the coupling configuration comprises a locking component having an engagement surface arrangement which faces radially outward with reference to the conduit axis and is displaceable between a locked position located radially farther from the conduit axis and an unlocked position located radially closer to the conduit axis;

a locking actuator that is shiftable along the conduit axis between an engagement position in which the locking actuator is in engagement with the locking component in such a way that it prevents a displacement of the engagement surface arrangement from the locked position into the unlocked position and a release position in which the locking actuator permits assumption of the unlocked position by the engagement surface arrangement;

an actuator drive system that is motion-transferringly connected to the locking actuator in order to drive the locking actuator at least in a motion direction for shifting between an engagement position and a release position; and a stripper arrangement that is shiftable along the conduit axis between a stripping position in which the stripper arrangement is located closer to the coupling longitudinal end and a readiness position in which the stripper arrangement is located farther from the coupling longitudinal end;

wherein the coupling configuration comprises, at an axial distance from the locking component a sealing component that is embodied separately from the locking component and extends around the pipetting conduit; and wherein the actuator drive system comprises a switchable magnetic-field source and a ferromagnetic reaction component movable by the locally modifiable magnetic field of the switchable magnetic-field source, the ferromagnetic reaction component being motion-transferringly connected to the locking actuator;

wherein a pipette tip is attached to the coupling configuration, and the engagement surface arrangement of the locking component is in the locked position and thereby retains the pipette tip on the coupling configuration; the locking actuator being in the engagement position and thus preventing a displacement of the engagement surface arrangement from the locked position into the unlocked position; and the pipette tip retaining the stripper arrangement in the readiness position against a preload force of a stripper preloading means.

* * * * *